(No Model.)
J. H. PENDLETON.
DRILL.
No. 283,509. Patented Aug. 21, 1883.
Fig. 1.
Fig. 3. Fig. 2.
 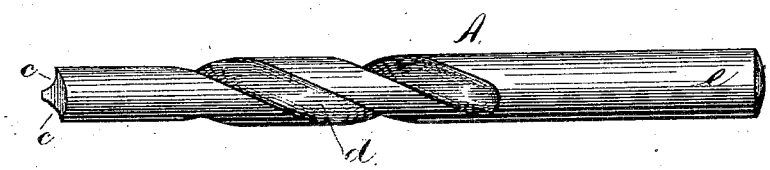
Witnesses
Harold Serrell.
Chas H Smith
Inventor
John H. Pendleton
per Lemuel W. Serrell

United States Patent Office.

JOHN H. PENDLETON, OF BROOKLYN, ASSIGNOR TO HIMSELF, AND NELVIL W. H. HIX, OF NEW YORK, N. Y., AND ALEXANDER H. TIERS AND CORNELIUS TIERS, OF MADISON, NEW JERSEY.

DRILL.

SPECIFICATION forming part of Letters Patent No. 283,509, dated August 21, 1883.

Application filed April 9, 1883. (No model.)

*To all whom it may concern:*

Be it known that I, JOHN H. PENDLETON, of Brooklyn, in the county of Kings and State of New York, have invented an Improvement in Drills, of which the following is a specification.

Twist-drills have heretofore been made and used extensively; but in boring metal the drill often runs into crevices, and in consequence of the screw form it also frequently passes through the metal, as the boring is finished before the hole is perfectly made, and the consequence is that the twist-drill is very often broken by use. Drills have also been flattened, and they have been grooved or channeled lengthwise; but in these drills the chips and borings wedge into the groove, and do not free themselves, especially when the hole is deep. The cutting-edge of the drill, that is grooved or flattened longitudinally, is recognized as preferable to the cutting-edge of the twist-drill, because it is less likely to break, being more obtuse, and there is no tendency in the straight drill to run forward or screw into the metal.

My invention is made for combining the advantageous features of both the straight and the twist drill, and for obviating the difficulties that have been experienced in both.

In the drawings, Figure 1 is an elevation of the drill. Fig. 2 is a similar view at right angles to Fig. 1, and Fig. 3 is an end view.

The cutting portion of the drill is made of a circular rod or bar of steel, A, the opposite sides of which are grooved longitudinally for a distance sufficient to allow for the ordinary wear and sharpening. The end of the drill is ground off at an angle in a manner corresponding to the edge of a metal cutting tool, and the grooves in the tool are longitudinal at *c*, and then they merge into the spiral grooves *d*, which pass around the cylindrical boring-tool for the proper distance along such tool, so as to act to remove the chips and shavings that are produced by the cutting-edges.

When in use this improved boring-tool is not liable to vibrate or jump, especially in starting the hole, and the chips produced in boring work along the straight grooves, and are then carried out by the screw action of the twist-grooves.

It is usually preferable to grind the drill near the end, so that it will be of the largest diameter at the straight cutting-edge at the groove, the metal being ground off slightly behind this edge. This causes the drill to cut with great freedom and to act like a reamer upon the inner surface of the metal and make the hole very smooth, and this is accomplished without the drill tending to run into the metal by the screw action of the twist. The upper part, *e*, of the drill is round, so as to be received into the chuck or holder.

I claim as my invention—

1. A boring-drill consisting of a round rod with the cutting-edges at one end, longitudinal grooves extending from the cutting-edges, the forward portion of each groove next the cutting-edges being straight and parallel with the drill, and the remaining portion of each groove being spiral, substantially as set forth.

2. A drill for boring metals, having longitudinal grooves extending from the cutting-edges, the forward portion of each groove next the cutting-edges being straight and parallel with the drill, and the remaining portion of each groove being spiral, and a round upper end to the drill, substantially as set forth.

3. In a drill for boring metals, the straight and spiral portions of the longitudinal grooves opening into each other, and the end of the drill slightly largest at the cutting-edge of the longitudinal grooves, substantially as set forth.

Signed by me this 4th day of April, A. D. 1883.

J. H. PENDLETON.

Witnesses:
GEO. T. PINCKNEY,
WILLIAM G. MOTT.